United States Patent
Fukuda et al.

(10) Patent No.: US 11,649,879 B2
(45) Date of Patent: May 16, 2023

(54) PORTAL UNIT

(71) Applicant: Kanzaki Kokyukoki Mfg. Co., LTD., Amagasaki (JP)

(72) Inventors: Toshiyuki Fukuda, Amagasaki (JP); Yuki Hashimoto, Amagasaki (JP); Keith Johnson Andrews, Morristown, TN (US)

(73) Assignee: Kanzaki Kokyukoki Mfg. Co., LTD., Amagasaki (JP)

( * ) Notice: Subject to any disclaimer, the term of this patent is extended or adjusted under 35 U.S.C. 154(b) by 0 days.

(21) Appl. No.: 17/547,108

(22) Filed: Dec. 9, 2021

(65) Prior Publication Data

US 2022/0186814 A1   Jun. 16, 2022

Related U.S. Application Data

(60) Provisional application No. 63/123,775, filed on Dec. 10, 2020.

(51) Int. Cl.
*F16H 1/06* (2006.01)
*F16H 57/023* (2012.01)

(52) U.S. Cl.
CPC ............. *F16H 1/06* (2013.01); *F16H 57/023* (2013.01)

(58) Field of Classification Search
CPC ... B60B 35/001; B60K 17/043; F16H 57/031; F16H 57/023; B60G 2206/50
See application file for complete search history.

(56) References Cited

U.S. PATENT DOCUMENTS

| | | | |
|---|---|---|---|
| 8,985,264 B2* | 3/2015 | Shirley | B60K 17/043 180/371 |
| 10,527,130 B2* | 1/2020 | Shirley | B60K 17/043 |
| 10,889,182 B1* | 1/2021 | Lee | B60K 17/043 |
| 2012/0181850 A1* | 7/2012 | Armfield | B60B 35/003 301/132 |

* cited by examiner

*Primary Examiner* — Jake Cook
(74) *Attorney, Agent, or Firm* — Sterne, Kessler, Goldistein & Fox PLLC (57) ABSTRACT

A portal unit is provided. The portal unit includes a deceleration gear train and a housing. The housing includes an inner side wall that is formed with an input opening at a position above a rotation axial line of a driving wheel, an outer side wall that is formed with an output opening at a coaxial position with the rotation axial line of the driving wheel, and an intermediate wall that connects peripheral edges of the inner side wall and the outer side wall. The inner side wall is provided, at a radially outward position of the input opening, with mount bolts for the suspension unit. The mount bolts each include a shaft portion protruding inwardly in a vehicle width direction.

11 Claims, 11 Drawing Sheets

PORTAL UNIT

TECHNICAL FIELD

The present invention relates to a portal unit interposed between a suspension unit and a driving wheel in a vehicle.

BACKGROUND ART

A portal unit for use in a vehicle such as a UTV has been proposed so as to improve vehicle drivability in off-road or the like (for example, U.S. Pat. No. 8,985,264 and 10,479, 156).

The portal unit is interposed between a suspension unit, which is provided in the vehicle, and a wheel, and is provided with, in detail, an input portion which inputs a rotational power operatively transmitted through a travel transmission device from a drive source in the vehicle, an output portion which outputs the rotational power toward a driving wheel, a deceleration gear train which decelerates a drive power from the input portion and transmits the decelerated drive power to the output portion, and a housing which supports the input portion and the output portion and houses the deceleration gear train.

The housing supports the output portion on an axis coaxial with a rotation axial line of the driving wheel so that the output portion faces the driving wheel and outputs the rotational power to the outer side in the vehicle width direction, which is the near side to the drive wheel in the vehicle width direction, and also supports the input portion above the rotation axial line of the driving wheel so that the input portion inputs the rotational power from the inner side in the vehicle width direction, which is the far side from the driving wheel in the vehicle width direction. In addition to the configuration, the housing is so configured as to allow an outer end portion of the suspension unit in the vehicle width direction to be connected to the inner side of the housing in the vehicle width direction.

The portal unit having such a configuration is useful in that, while increasing the minimum ground height of the vehicle, the portal unit can decelerate the drive power, which power is operatively transmitted from the drive source, at a predetermined deceleration ratio, and output the decelerated drive power toward the driving wheel.

However, the portal unit described in each of the patent documents (hereinafter referred to as the conventional configuration) had the following problem.

That is, the connection of the suspension unit to the portal unit is performed via a connection member (knuckle member) that is fixed to a side wall on the inner side in the vehicle width direction in the housing (hereinafter referred to as inner side wall).

In detail, the housing includes a housing body and a cover. Based on the condition where the housing is mounted on the vehicle, the housing body has an end wall substantially vertically extending to form the inner side wall, and a peripheral wall extending outward in the vehicle width direction from a peripheral edge of the end wall. The cover is detachably connected to the housing body via a plurality of connection bolts in a manner to close an opening on a free end side of the peripheral wall.

The connection member has a mount plate that is fixed to the inner side wall of the housing in an overlapped state, and a bracket that is fixed to the mount plate and to which a suspension arm in the suspension unit is connected.

Here, in the conventional configuration, the mount plate is co-tightened together with the housing body and the cover by means of a plurality of connection bolts.

That is, the plurality of connection bolts is arranged along a circumferential direction in a peripheral area of the housing body and the cover when viewed along the vehicle width direction.

Therefore, in order to co-tighten the mount plate with the housing body and the cover by means of the plurality of connection bolts, the mount plate has to be substantially the same size as the housing body's end wall acting as the inner side wall, which increases the weight and cost of the connection member.

In addition, the conventional configuration where the mount plate, the housing body, and the cover are co-tightened has a problem that the assembly work efficiency of the connection member is poor.

SUMMARY OF THE INVENTION

The present invention has been made in view of the conventional technology; it is an object of the present invention to provide a portal unit which decelerates a rotational power operatively transmitted from a vehicle and outputs the decelerated rotational power to a driving wheel, to which a suspension unit mounted on the vehicle is connected via a connection member, and for which downsizing of the connection member and improvement of the assembly work efficiency can be achieved.

In order to achieve the object, the present invention provides a portal unit interposed between a suspension unit and a driving wheel in a vehicle, the portal unit including a deceleration gear train decelerating a rotational power that is operatively transmitted from a drive source provided in the vehicle and a housing accommodating the deceleration gear unit. In the portal unit, the housing includes an inner side wall that is formed, at a position above a rotation axial line of the driving wheel, with an input opening for inputting the rotational power operatively transmitted from the drive source into the deceleration gear train, an outer side wall that is formed, at a coaxial position with the rotation axial line of the driving wheel, with an output opening for outputting the rotational power, which is decelerated by the deceleration gear train, toward the driving wheel, and an intermediate wall that connects peripheral edges of the inner side wall and the outer side wall so as to form an accommodating space for accommodating the deceleration gear train. The inner side wall is provided, at a radially outward position of the input opening, with mount bolts for the suspension unit. The mount bolts each include a shaft portion protruding inwardly in a vehicle width direction.

The portal unit according to the present invention makes it possible to downsize a connection member that is fixed to the inner side wall of the housing in the portal unit and to which a tip end side (an outer side in the vehicle width direction) of the suspension unit is connected in a swingable manner.

That is, in the conventional portal unit, a connection member is fixed to a housing by being co-tightened together with a housing body and a cover that are components of the housing.

Specifically, the housing in the conventional portal unit includes a housing body with an installation opening through which a deceleration gear train can be inserted and a cover connected to the housing body so as to close the installation opening, the housing body and the cover being detachably connected to each other by a plurality of connection bolts.

The connection member is co-tightened together with the housing body and the cover by using the plurality of connection bolts.

Since the plurality of connection bolts are arranged at peripheral edge regions of the housing body and the cover, in order to allow the connection member to be co-tightened together with the housing body and the cover by the plurality of connection bolts, it is needed to cause the connection member to have the same size as the housing body and the cover as viewed in the vehicle width direction.

On the contrary, the portal unit according to the present invention makes it possible to fix the connection member to the inner side wall of the housing with using mount bolts provided at the inner side wall of the housing.

Accordingly, the connection member can be freely downsized without being constrained by the size of the housing.

Further, according to the portal unit of the present embodiment, it is possible to fix the connection member to the housing independently from the assembly work of the housing, and thereby the efficiency of the assembly work of the connection member can be improved.

In a preferable embodiment, the mount bolt includes a shaft portion with a male thread and a head portion provided on one end side of the shaft portion, and the inner side wall is formed with bolt mount holes into which the mount bolts are inserted.

The bolt mount hole has a large diameter portion that extends from an inner surface of the inner side wall in a direction toward an outer surface of the inner side wall, and a small diameter portion that is reduced in diameter with a step portion from a tip end of the large diameter portion and opens to the outer surface of the inner side wall.

The large diameter portion has an opening diameter into which the head portion can be inserted, and the small diameter portion has an opening diameter smaller than the head portion and larger than the shaft portion.

The mount bolt is configured such that, with the head portion in contact with the step portion, the tip end side of the shaft portion protrudes outward from the outer surface of the inner side wall.

In a more preferable embodiment, the mount bolt is inserted in the bolt mount hole in such a manner as to be un-rotatable around the axial line and to be immovable in the axial line direction with respect thereto. This configuration can enhance a mount strength of the mount bolt to the connection member.

The mount bolt is un-rotatable around the axial line and immovable in the axial line direction with respect to the bolt mount hole by, for example, press-fitting the shaft portion into the small diameter portion.

The mount bolt is un-rotatable around the axial line and immovable in the axial line direction with respect to the bolt mount hole by press-fitting the head portion into the large diameter portion, and/or, making the head portion and the shaft portion non-circular shape in a cross-section. This configuration can further enhance the mount strength of the mount bolt to the connection member.

In a first embodiment, the housing has a housing body and a cover, wherein the housing body includes an end wall and a peripheral wall extending from a peripheral edge of the end wall in a thickness direction of the end wall and is provided, on a far side of the peripheral wall from the end wall, with an installation opening through which the deceleration gear train can be inserted, wherein the cover is detachably connected to the housing body by connection bolts in such a manner as to close the installation opening and wherein the cover forms the inner side wall and the end wall forms the outer side wall.

In the first embodiment, the peripheral wall is provided with threaded holes that are opened to an end face on the free end side of the peripheral wall so that the connection bolts are screwed thereinto, the cover is provided, at positions respectively corresponding to the threaded holes, with connection holes through which the connection bolts are respectively inserted, and the axial line positions of the mount bolts are located inside an area which is defined by connecting the axial lines of threaded holes as viewed along the vehicle width direction in a state that the portal unit is mounted on the driving wheel.

In a second embodiment different from the first embodiment, the housing has a housing body and a cover, wherein the housing body includes an end wall and a peripheral wall extending from a peripheral edge of the end wall in a thickness direction of the end wall and is provided, on a far side of the peripheral wall from the end wall, with an installation opening through which the deceleration gear train can be inserted, wherein the cover is detachably connected to the housing body by connection bolts in such a manner as to close the installation opening, and wherein the cover forms the outer side wall, and the end wall forms the inner side wall.

In the second embodiment, the peripheral wall is provided with threaded holes that are opened to an end face on the free end side of the peripheral wall so that the connection bolts are screwed thereinto, the cover is provided, at positions respectively corresponding to the threaded holes, with connection holes through which the connection bolts are respectively inserted, and the bolt mount holes are located inward of the peripheral wall in the radial direction in a state that the portal unit is mounted on the driving wheel.

The portal unit according to the present invention may further include an input portion supported by the housing so as to receive, through the input opening, the rotational power that is operatively transmitted from the drive source, and an output portion supported by the housing so as to output, through the output opening toward the driving wheel, the rotational power that is decelerated by the deceleration gear train.

The deceleration gear train has a driving side gear supported by the input portion in a manner to be relatively un-rotatable around the axial line with respect thereto, a driven side gear supported by the output portion in a manner to be relatively un-rotatable around the axial line with respect thereto, and an idle gear engaged with both the driving side gear and the driven side gear.

In a preferable embodiment, the idle gear may include first and second idle gears that are symmetrically arranged across a virtual center plane connecting an axial line of the input portion and an axial line of the output portion.

DETAILED DESCRIPTION OF THE PREFERRED EMBODIMENTS

One embodiment of a portal unit according to the present invention will be described below with reference to the accompanying drawings.

Figure 1:
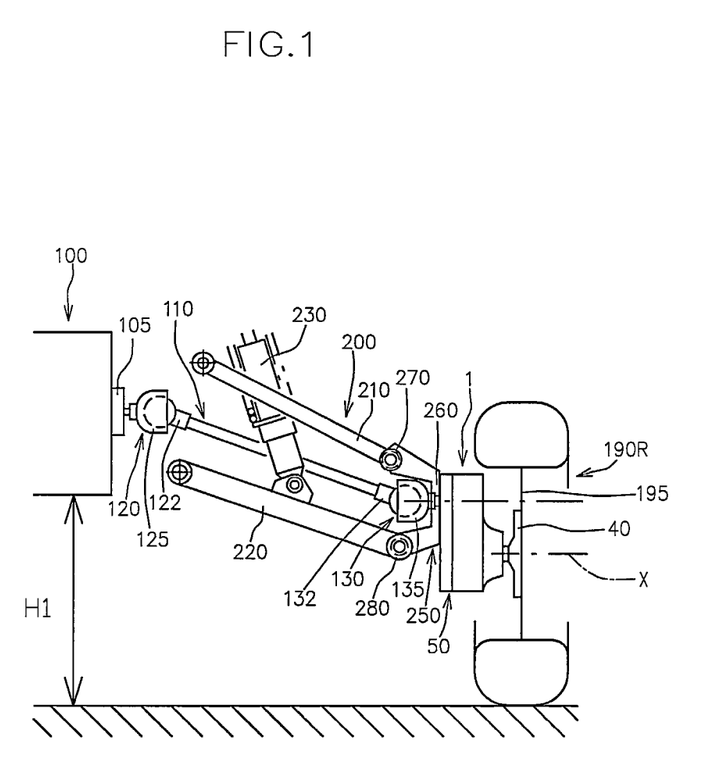
FIG. 1 is a schematic rear view in the vicinity of a rear wheel in a vehicle to which a portal unit 1 according to one embodiment of the present invention is applied.

FIG. 1 illustrates a schematic rear view in the vicinity of a rear wheel 190R to which a portal unit 1 of the present embodiment is applied.

Figure 2:
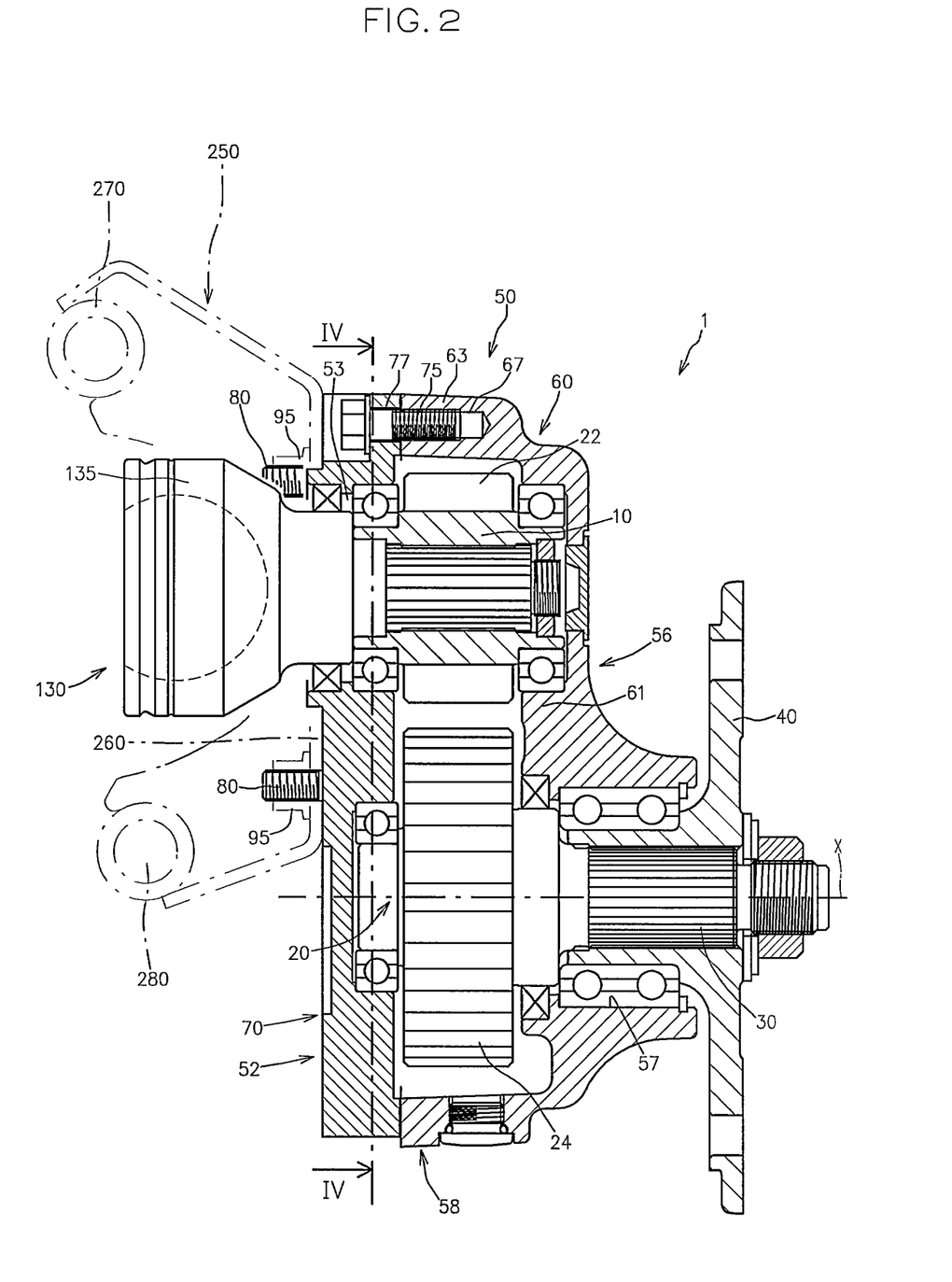
FIG. 2 is a vertical cross-sectional view of the portal unit.
Figure 3:
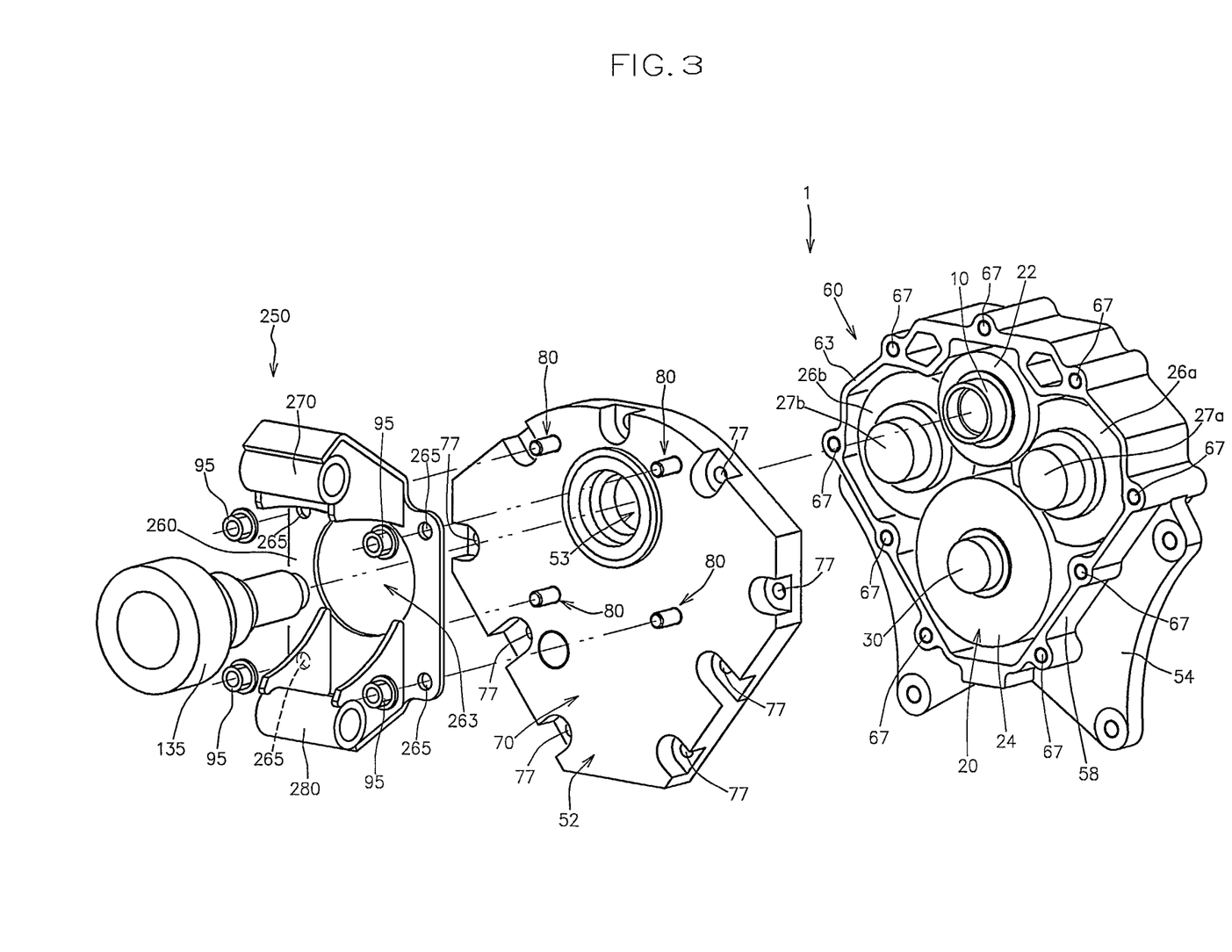
FIG. 3 is an exploded perspective view of the portal unit as viewed from the inner side in the vehicle width direction.

FIGS. 2 and 3 illustrate, respectively, a vertical cross-sectional view of the portal unit 1, and an exploded perspective view of the portal unit 1 which is viewed from the inner side in the vehicle width direction.

In this specification, the vehicle width direction means a direction which is based on a state where the portal unit 1 is mounted on the vehicle.

The portal unit 1 is a member that decelerates a rotational power, which is operatively transmitted from a drive source, at a predetermined deceleration ratio, and outputs the decelerated rotational power toward a driving wheel, while increasing a minimum ground height of the applied vehicle to H1 (see FIG. 1, and FIG. 7 below), and the portal unit 1 is preferably applied to vehicles such as UTV, for the purpose of improving the vehicle drivability in off-road and the like.

The portal unit 1 is so configured as to input, above a rotation axial line X of the applicable driving wheel (rear wheel 190R in FIG. 1), a rotational power operatively transmitted from a drive source (not illustrated) in the vehicle, decelerate the input rotational power, and output the decelerated rotational power to the driving wheel on an axis coaxial with the rotation axial line X of the driving wheel; further, to allow a non-steered wheel suspension unit 200 provided in the vehicle to be connectable via a non-steered wheel connection member 250 (non-steered wheel knuckle member) mounted on the inner side wall in the vehicle width direction.

Figure 4:
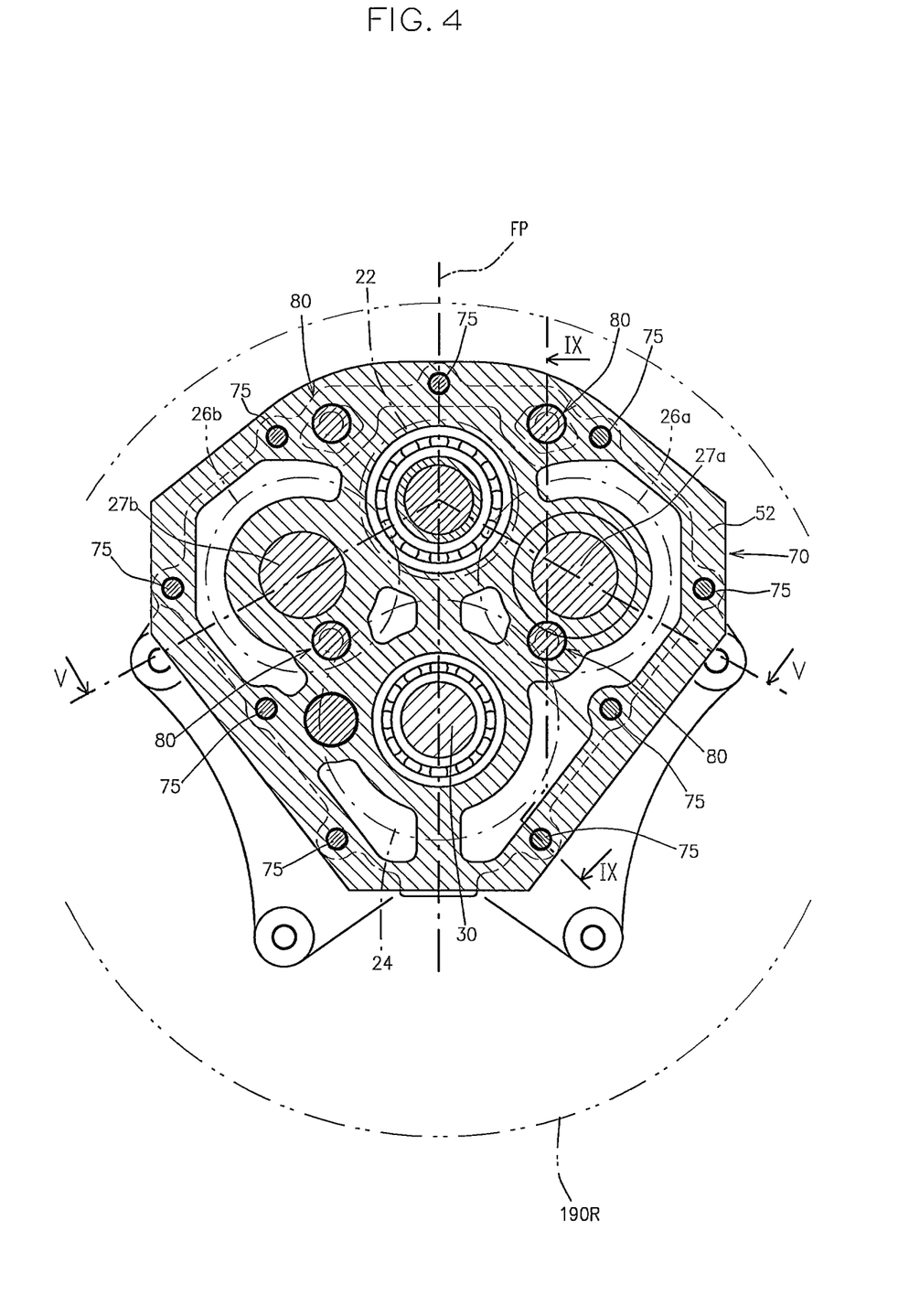
FIG. 4 is a cross-sectional view along the line IV-IV in FIG. 2.

FIG. 4 illustrates a cross-sectional view along the line IV-IV in FIG. 2.

Figure 5:
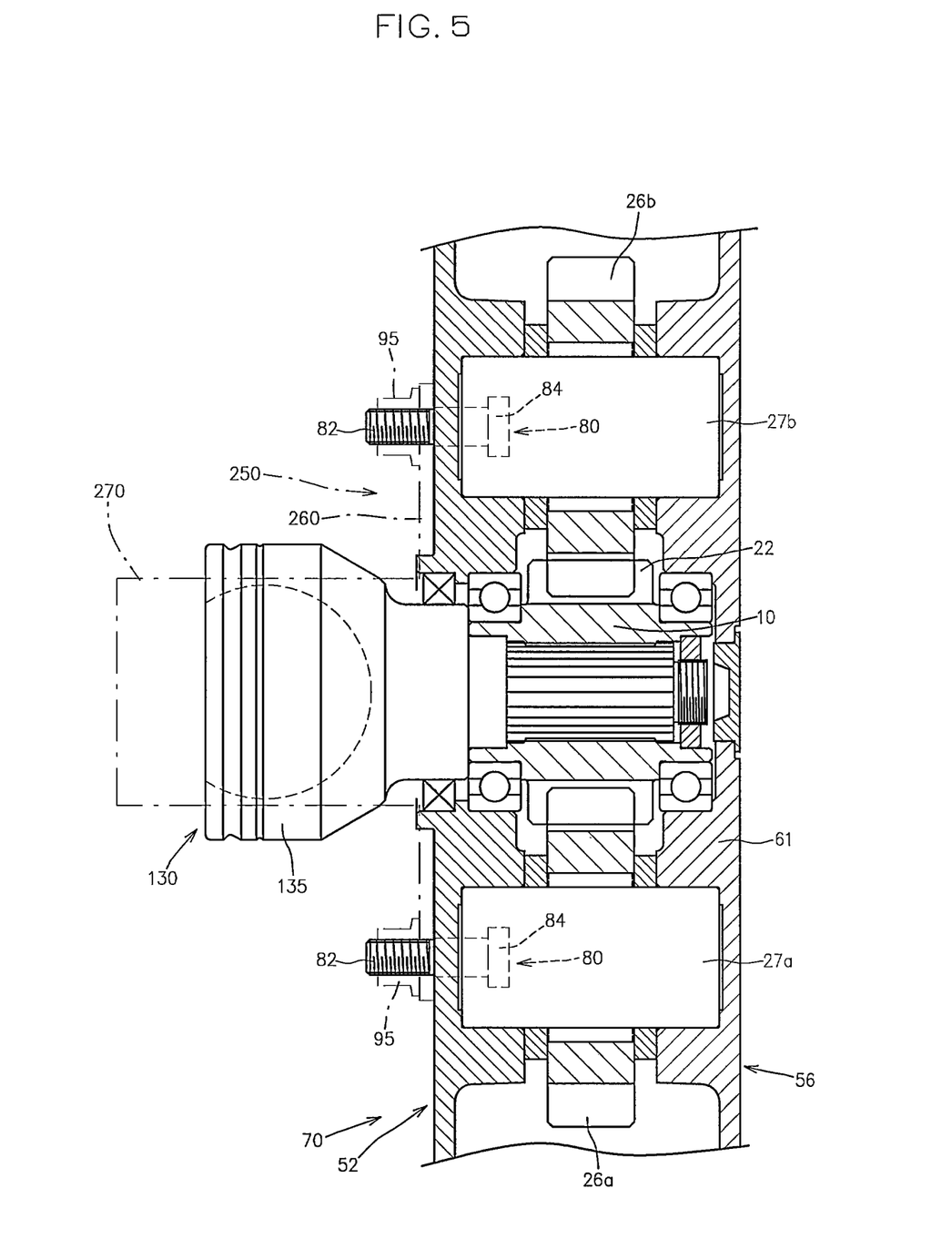
FIG. 5 is a cross-sectional view along the line V-V in FIG. 4.

FIG. 5 illustrates a cross-sectional view along the line V-V in FIG. 4.

The portal unit 1 is provided with a deceleration gear train 20 that decelerates the rotational power operatively transmitted from the drive source, and a housing 50 that houses the deceleration gear train 20.

The rotational power from the drive source is operatively transmitted to the portal unit 1 via, for example, a transmission device 100 (see FIG. 1) provided in the vehicle.

As illustrated in FIG. 1, the vehicle is provided with a transmission shaft 110 that transmits the rotational power of an output portion 105 of the transmission device 100 to an input portion of the portal unit 1.

An upstream constant-velocity joint 120 and a downstream constant-velocity joint 130 are provided at a base end portion located upstream in the transmission direction and at a tip end portion located downstream in the transmission direction of the transmission shaft 110, respectively.

The base end portion of the transmission shaft 110 is connected to the output portion 105 of the transmission device 100 via the upstream constant-velocity joint 120 in a manner to be relatively un-rotatable around the axial line and to be swingable with respect thereto, and the tip end portion of the transmission shaft 110 is connected to the input portion of the portal unit 1 via the downstream constant-velocity joint 130 in a manner to be relatively un-rotatable around the axial line and to be swingable with respect thereto.

In detail, the upstream constant-velocity joint 120 has an upstream inner cylindrical member 122 connected to the base end portion of the transmission shaft 110 in a manner to be relatively un-rotatable around the axial line with respect thereto, and an upstream outer cylindrical member 125 connected to the output portion 105 of the transmission device 100 in a manner to be relatively un-rotatable around the axial line with respect thereto, and the upstream inner cylindrical member 122 is inserted into the upstream outer cylindrical member 125 in a manner to be relatively un-rotatable around the axial line and to be swingable with respect thereto.

As illustrated in FIGS. 1 and 2, the downstream constant-velocity joint 130 has a downstream inner cylindrical member 132 connected to a tip end portion of the transmission shaft 110 in a manner to be relatively un-rotatable around the axial line with respect thereto, and a downstream outer cylindrical member 135 connected to a cylindrical input shaft 10, which acts as an input portion of the portal unit 1, in a manner to be relatively un-rotatable around the axial line with respect thereto, and the downstream inner cylindrical member 132 is inserted into the downstream outer cylindrical member 135 in a manner to be relatively un-rotatable around the axial line and to be swingable with respect thereto.

The housing 50 has an inner side wall 52 located on the inner side in the vehicle width direction, an outer side wall 56 located on the outer side of the inner side wall 52 in the vehicle width direction, and an intermediate wall 58 connecting the peripheral edges of the inner side wall 52 and the outer side wall 56.

As illustrated in FIGS. 2 and 3, in the present embodiment, the housing 50 has a housing body 60 and a cover 70. The housing body 90 includes an end wall 61 and a peripheral wall 63 extending from a peripheral edge of the end wall 61 in the thickness direction of the end wall 61, the housing being provided, on the far side of the peripheral wall 63 from the end wall 61, with an installation opening through which the deceleration gear train 20 can be inserted. The cover 70 is detachably connected to the housing body 60 by a connection bolt 75 in a manner to close the installation opening. In the present embodiment, the cover 70, the end wall 61 and the peripheral wall 63 form the inner side wall 52, the outer side wall 56 and the intermediate wall 58, respectively.

Alternatively, it is possible to modify the housing 50 in a manner to include a housing body integrally having an end wall forming the inner side wall 52 and a peripheral wall forming the intermediate wall 58, and a cover forming the outer side wall 56.

As illustrated in FIGS. 2 and 3, the peripheral wall 63 of the housing body 60 is provided with a threaded hole 67 into which the connection bolt 75 is screwed, and, at a position corresponding to the threaded hole 67, the cover 70 is provided with a connection hole 77 through which the connection bolt 75 is inserted.

The housing body 60 and the cover 70 are formed, for example, by casting. In the present embodiment, the housing body 60 and the cover 70 are each made of aluminum casting for weight reduction. When the cover 70 is made of cast iron, the thickness thereof can be reduced.

As illustrated in FIGS. 2, 3 and the like, the inner side wall 52 is provided, at a position above the rotation axial line X of the driving wheel, with an input opening 53 for inputting the rotational power operatively transmitted from the drive source into the deceleration gear train 20.

In the present embodiment, as described above, the portal unit 1 has the cylindrical input shaft 10 acting as the input portion of the portal unit 1, and the downstream outer cylindrical member 135 is connected to the cylindrical input shaft 10 via the input opening 53 in a manner to be relatively un-rotatable around the axial line with respect thereto.

As illustrated in FIG. 2, the outer side wall 56 is provided, at the coaxial position with the rotation axial line X of the driving wheel, with an output opening 57 for outputting the rotational power, which is decelerated by the deceleration gear train 20, toward the driving wheel.

In the present embodiment, the portal unit 1 has a drive axle 30 as an output portion for outputting the rotational power, which is decelerated by the deceleration gear train 20, toward the driving wheel, and the drive axle 30 is extended outwardly through the output opening 57.

An output flange 40 is mounted at an outward extension portion of the drive axle 30 in a manner to be relatively un-rotatable around the axial line with respect thereto, and the output flange 40 is connected to a hub 195 (see FIG. 1) of the driving wheel.

The deceleration gear train 20 can be configured in various ways as long as it decelerates the rotational power of the input portion (the cylindrical input shaft 10 in the present embodiment) and transmits the decelerated rotational power to the output portion (the drive axle 30 in the present embodiment).

In the present embodiment, as illustrated in FIGS. 3 to 5, the deceleration gear train 20 has a driving side gear 22 supported by the input portion in a manner to be relatively un-rotatable around the axial line with respect thereto, a driven side gear 24 supported by the output portion in a manner to be relatively un-rotatable around the axial line with respect thereto, and an idle gear 26 engaged with both the driving side gear 22 and the driven side gear 24.

The idle gear 26 is larger in diameter than the driving side gear 22, and the driven side gear 24 is larger in diameter than the idle gear 26.

In the present embodiment, as illustrated in FIGS. 4 and 5, the deceleration gear train 20 has, as the idle gear 26, first and second idle gears 26a, 26b which are symmetrically arranged across a virtual center plane FP connecting the axial lines of the driving side gear 22 and the driven side gear 24 and which have the same diameter as each other.

As illustrated in FIGS. 4 and 5, the first and second idle gears 26a, 26b are supported by the first and second idle shafts 27a, 27b, respectively, in a manner to be relatively rotatable around the axial line.

As illustrated in FIG. 1, the non-steered wheel suspension unit 200 has an upper suspension arm 210 having a base end portion connected to a frame structure (not illustrated) of the vehicle in a swingable manner in a vertical direction around the axial line along a vehicle longitudinal direction, a lower suspension arm 220 disposed below the upper suspension arm 210 and having a base end portion connected to the frame structure in a swingable manner in the vertical direction around the axial line along the vehicle longitudinal direction, and a shock absorber 230 absorbing the vertical movement of one (the lower suspension arm 220 in the embodiment illustrated) of the upper suspension arm 210 and the lower suspension arm 220.

The tip end portions of the upper suspension arm 210 and the lower suspension arm 220 are connected to the non-steered wheel connection member 250, which is fixed to the inner side wall 52 of the housing 50, in a swingable manner.

As illustrated in FIGS. 1 to 3 and the like, the non-steered wheel connection member 250 has a mount plate 260 fixed to the inner side wall 52 in an overlapped state, and an upper bracket 270 and a lower bracket 280 which are supported by the mount plate 260.

In the present embodiment, the portal unit 1 is applied to the rear wheel 190R to serve as a non-steered wheel, and thus the upper bracket 270 and the lower bracket 280 have bearing holes along the vehicle longitudinal direction.

The tip end portions of the upper and lower suspension arms 210 and 220 are connected to the bearing holes of the upper and lower brackets 270 and 280, respectively, in a swingable manner in the vertical direction.

The mount plate 260 is so configured as to open the input opening 53 when being fixed to the inner side wall 52.

In the present embodiment, as illustrated in FIG. 3, the mount plate 260 is provided with an opening 263 that opens the input opening 53.

As illustrated in FIG. 3 and the like, in the present embodiment, at a radially outward position of the input opening 53, the inner side wall 52 is provided with mount bolts 80 protruding inwardly in the vehicle width direction.

The mount bolt 80 acts as a fastening member for detachably fastening the mount plate 260 to the inner side wall 52 (the cover 70 in the present embodiment).

The mount bolt 80 is provided in a position that does not interfere with the connection bolt 75.

Figure 6:
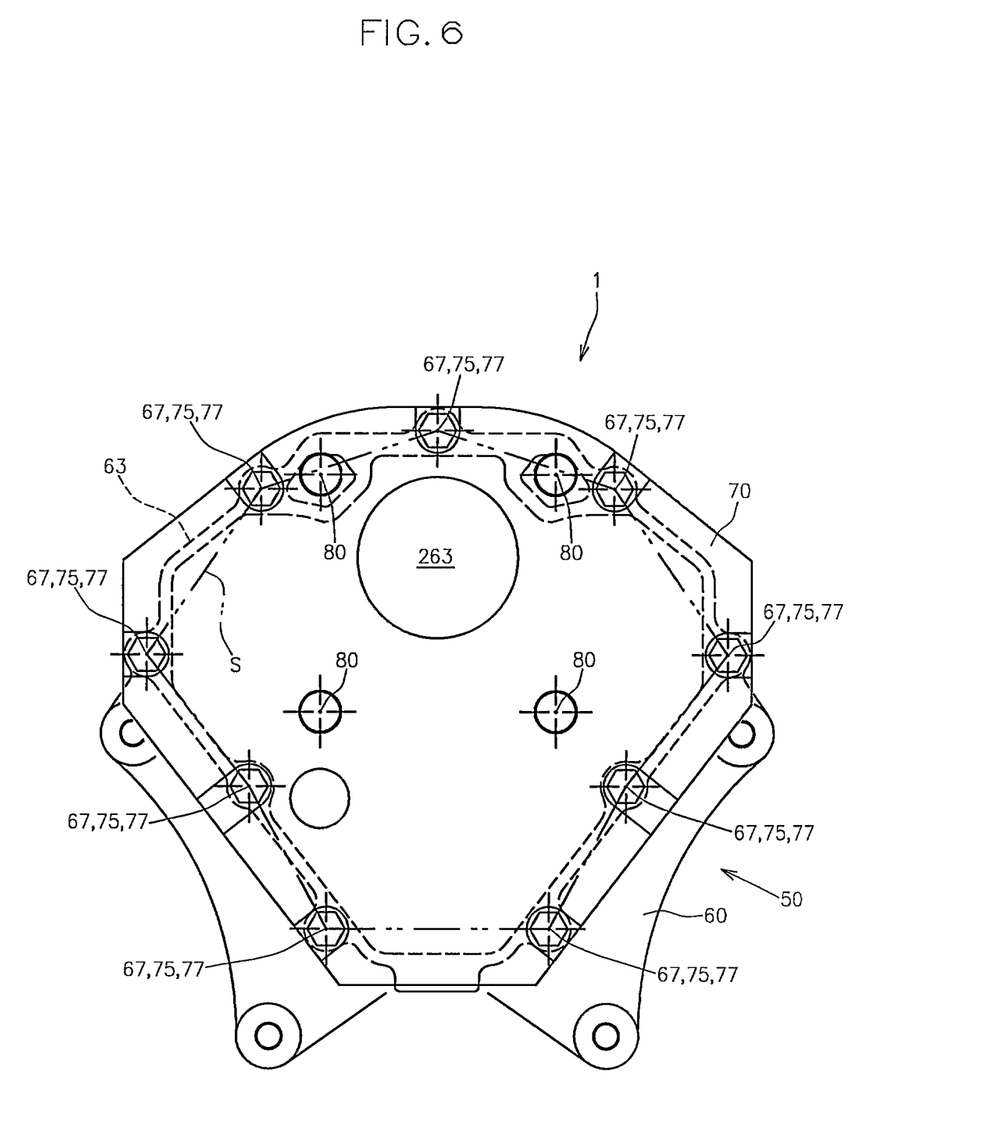
FIG. 6 is an end face view of the portal unit as viewed from inward in the vehicle width direction.

FIG. 6 illustrates an end face view of the portal unit 1 as viewed from inward in the vehicle width direction.

The dashed line in the figure illustrates the end face on the free end side of the peripheral wall 63 in the housing body 60.

As illustrated in FIGS. 3 and 6, the threaded hole 67 is formed in the peripheral wall 63 so as to be open to the end face on the free end side of the peripheral wall 63.

As illustrated in FIGS. 3 and 6, with the end face on the free end side of the peripheral wall 63 in contact with the inner surface of the cover 70, the housing body 60 and the cover 70 are connected by screwing the connection bolt 75, which is inserted into the connection hole 77, into the threaded hole 67.

Here, as illustrated in FIG. 6, in the present embodiment, the axial line position of the mount bolt 80 is located inside an area S which is defined, when viewed along the vehicle width direction, by connecting the axial lines of a plurality of threaded holes 67 (a plurality of connection bolts 75 and a plurality of connection holes 77).

As illustrated in FIG. 3, the mount plate 260 is provided with mount holes 265 through which the mount bolts 80 are inserted, and the mount plate 260 is fixed to the inner side wall 52 (the cover 70 according to the present embodiment) by fastening nuts 95 (see FIGS. 2, 3, and 5) to the mount bolts 80 inserted in the mount hole 265.

According to such a configuration, the size of the mount plate 260 can be reduced and the assembly work can be made more efficient, compared to the conventional portal unit.

That is, in the conventional portal unit, the mount plate to which the tip end side of the suspension arm is swingably connected is co-tightened together with a housing body and a cover in the conventional portal unit.

In this conventional configuration, a mount plate is the same in size as the housing body and the cover.

In contrast, according to the present embodiment, the mount plate 260 is connected to the inner side wall 52 by the mount bolt 80 provided at the inner side wall 52, rather than the connection bolt 75 connecting the housing body 60 and the cover 70, so that the mount plate 260 can be freely downsized without being constrained by the size of the inner side wall 52 (the cover 70 according to the present embodiment).

Accordingly, for example, the non-steered wheel connection member 250 mounted on the portal unit 1 according to the present embodiment can be used for an axle drive unit 400 that inputs, on an axis coaxial with the rotation axial line X of the driving wheel, the rotational power operatively transmitted from the vehicle, and transmits the input rotational power to the driving wheel without deceleration.

Figure 7:
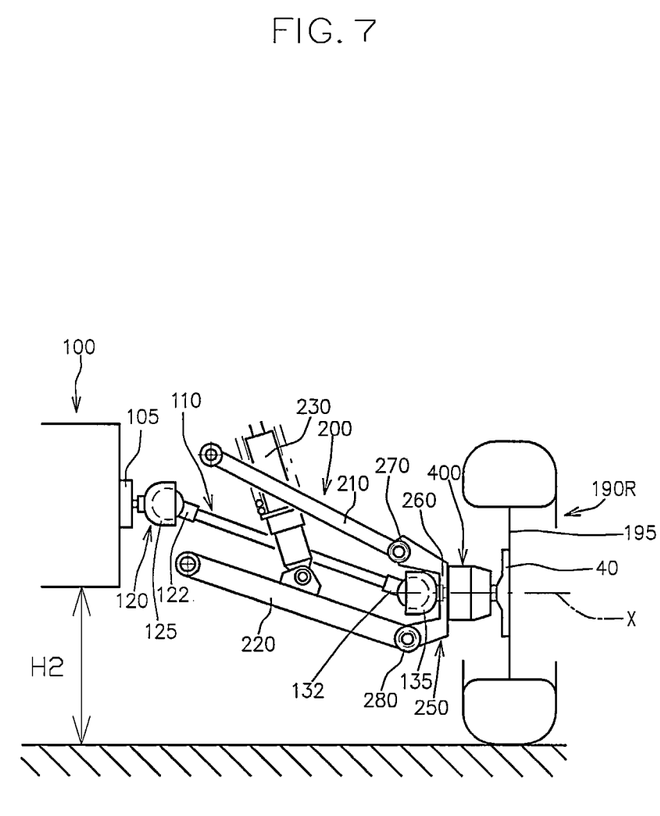
FIG. 7 is a schematic rear view in the vicinity of the rear wheel in a case where an axle drive unit configured to receive a rotational power from the drive source and transmit the rotational power without deceleration to the rear wheel is applied to the rear wheel.

FIG. 7 illustrates a schematic rear view in the vicinity of the rear wheel 190R with the non-steered wheel connection member 250 mounted on the axle drive unit 400.

Figure 8:
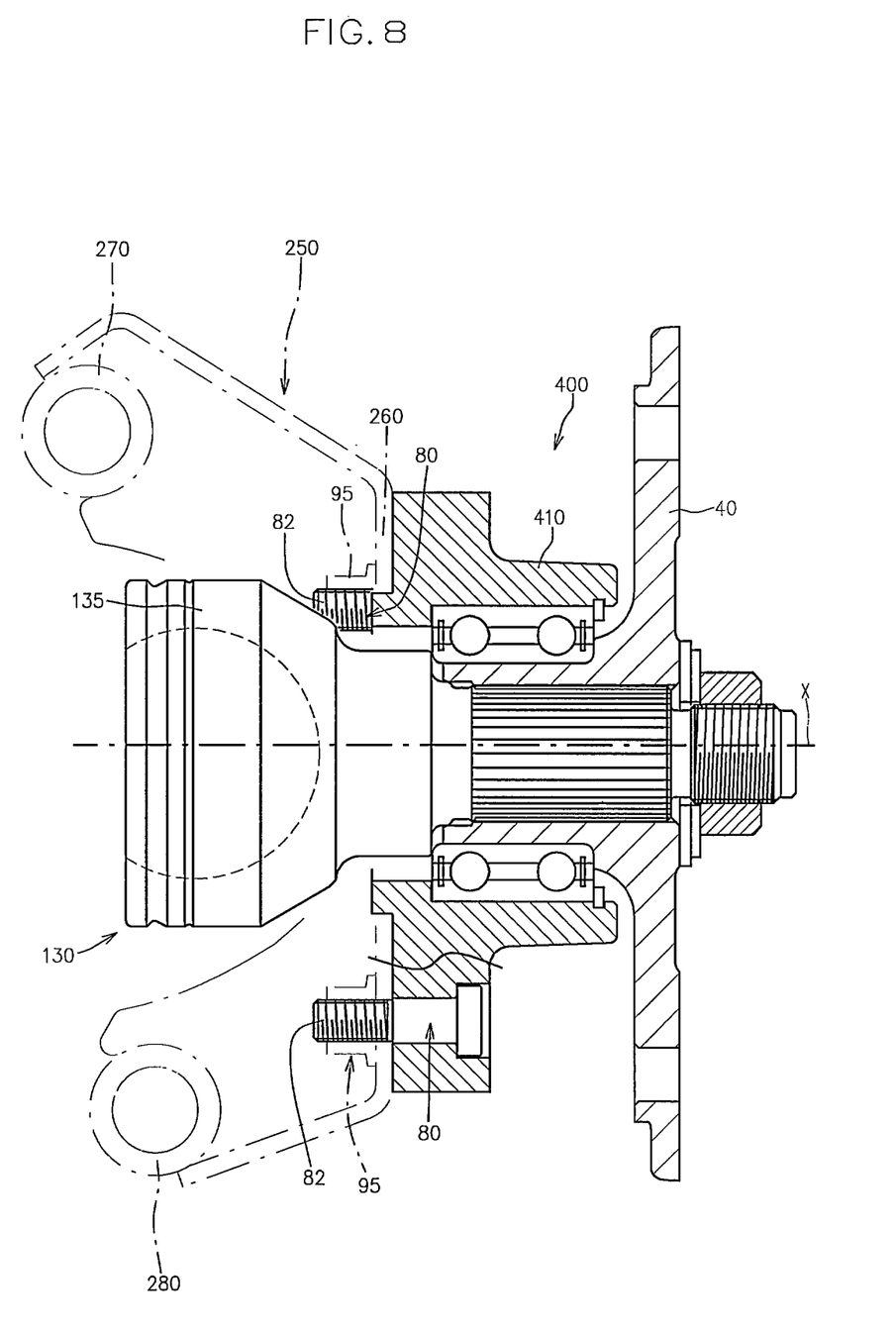
FIG. 8 is a vertical cross-sectional view of the axle drive unit.

FIG. 8 illustrates a vertical cross-sectional view of the axle drive unit 400.

In the drawings, the same members as those in the present embodiment are denoted by the same reference numerals.

The axle drive unit 400 has a housing 410. The housing 410 is so configured as to support the downstream outer cylindrical member 135, which serves both as an input portion and an output portion of the axle drive unit 400, on an axis coaxial with the rotation axial line X of the driving wheel (the rear wheel 190R in the embodiment illustrated).

As illustrated in FIG. 8, the non-steered wheel connection member 250 can also be mounted on the axle drive unit 400.

In this case, the minimum ground height of the vehicle is H2 lower than H1.

Further, according to the present embodiment, with the housing body 60 and the cover 70 connected by the connection bolt 75 thereby to form the housing 50, the mount plate 260 can be connected to the inner side wall 52 by using the mount bolt 80.

Accordingly, the efficiency of the assembly work of the non-steered wheel connection member 250 can be improved.

Figure 9:
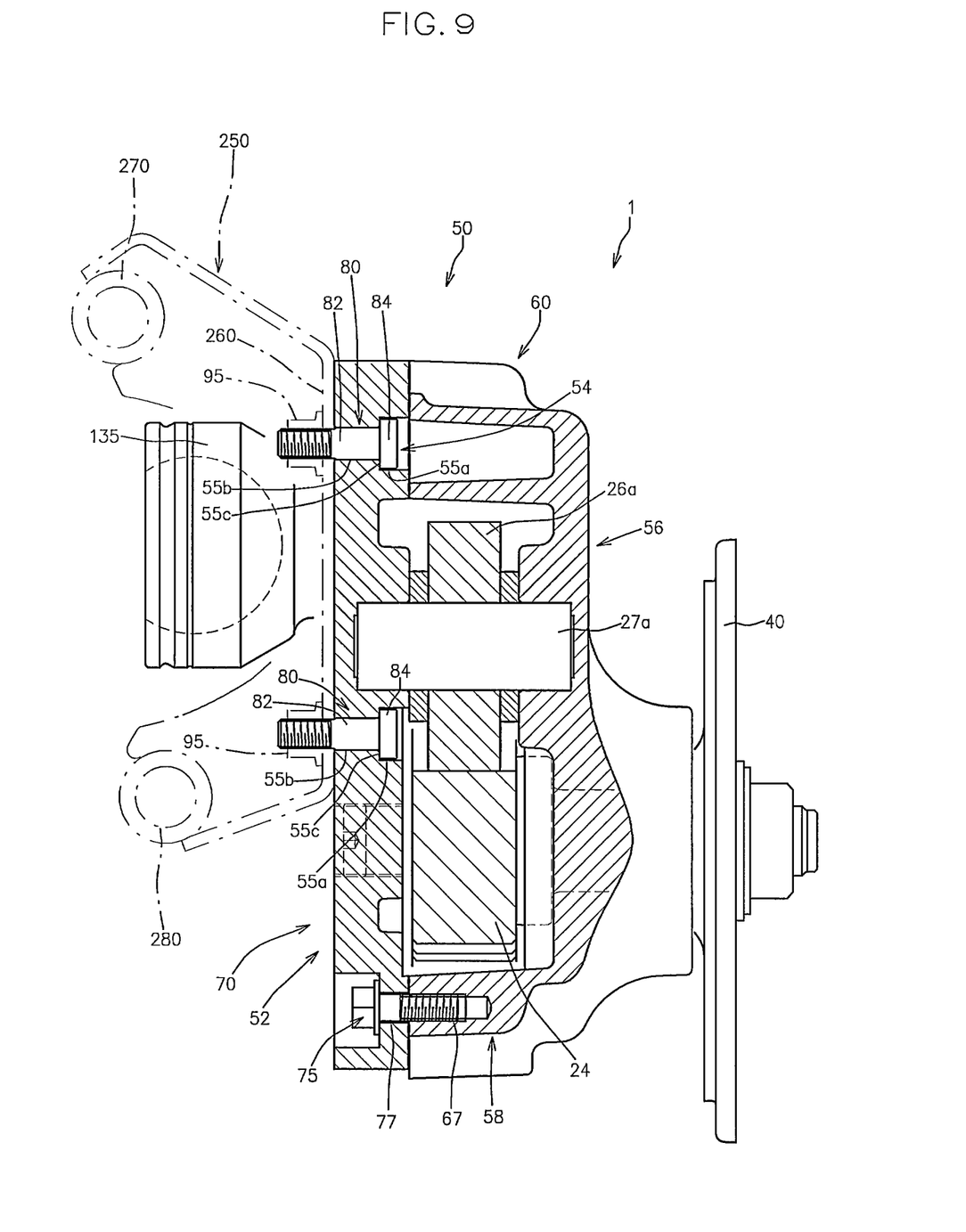
FIG. 9 illustrates a cross-sectional view along the line IX-IX in FIG. 4

FIG. 9 illustrates a cross-sectional view along the line IX-IX in FIG. 4. Further, FIG. 10 illustrates a perspective view of the inner side wall 52 (the cover 70 in the present embodiment) as viewed from the outer side in the vehicle width direction.

In the present embodiment, the mount bolt 80 is formed independently or separately from the inner side wall 52.

Figure 10:
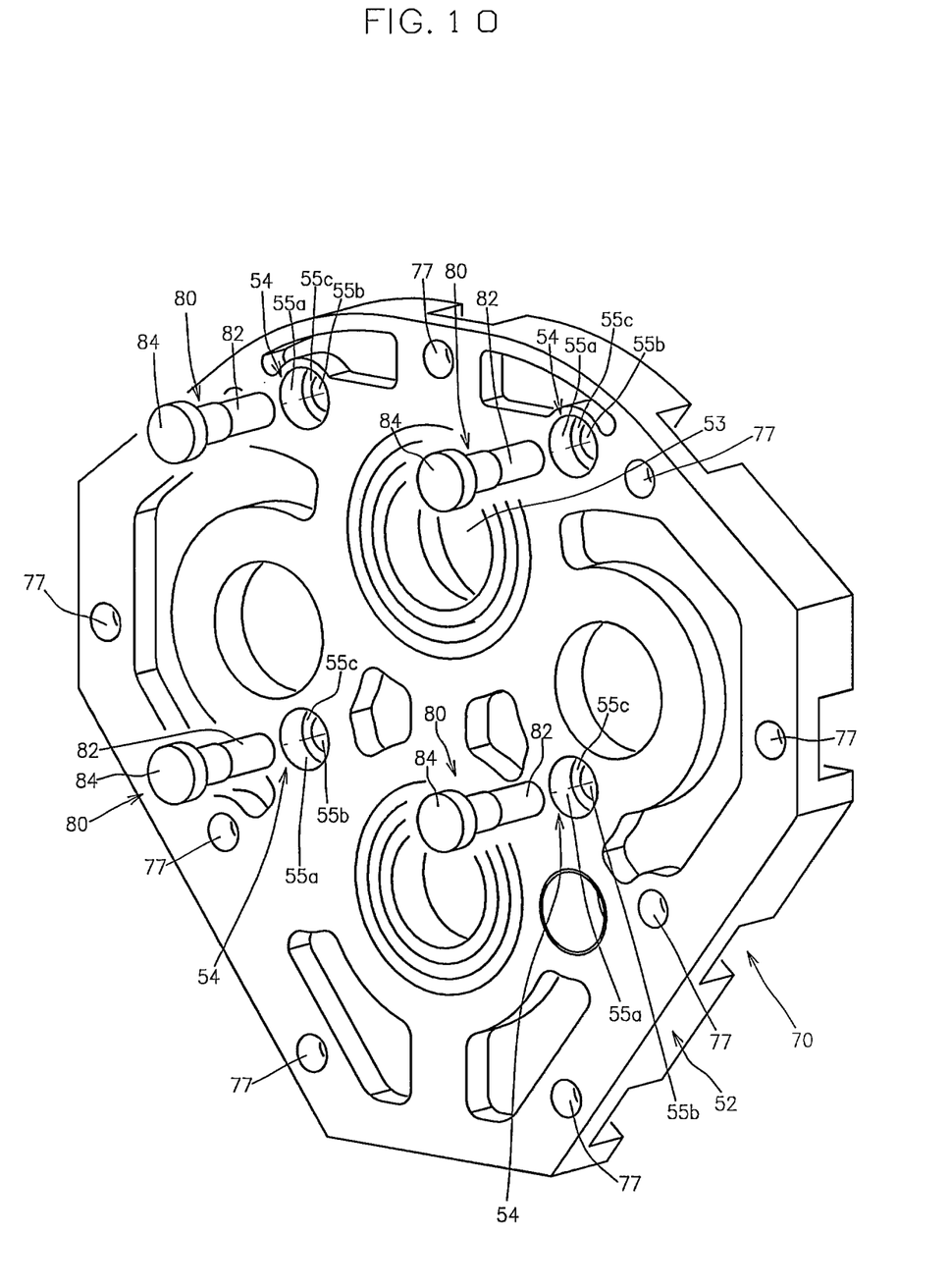
FIG. 10 is a perspective view of an inner side wall (a cover) of a housing in the portal unit as viewed from the outer side in the vehicle width direction.

In detail, as illustrated in FIGS. 9 and 10, the mount bolt 80 has a shaft portion 82 formed with a male thread and a head portion 84 provided on one end side of the shaft portion 82, and the inner side wall 52 has a bolt mount hole 54 into which the mount bolt 80 is inserted.

The bolt mount hole 54 has a large diameter portion 55a extending from an inner surface (a surface opposite to the surface to which the mount plate 260 is mounted) of the inner side wall 52 (the cover 70 in the present embodiment) in the direction toward the outer surface (a surface to which the mount plate 260 is mounted), and a small diameter portion 55b that is reduced in diameter with a step portion 55c from a tip end of the large diameter portion 55a (an end portion on the side close to the outer surface of the inner side wall 52) and opens to the outer surface of the inner side wall 52.

The large diameter portion 55a has an opening diameter into which the head portion 84 can be inserted, and the small diameter portion 55b has an opening diameter into which the head portion 84 cannot be inserted and into which the shaft portion 82 can be inserted.

The mount bolt 80 is configured such that, with the head portion 84 in contact with the step portion 55c, the tip end side of the shaft portion 82 protrudes outward from the outer surface of the inner side wall 52.

Preferably, the mount bolt 80 is inserted in the bolt mount hole 54 in a manner to be un-rotatable around the axial line and to be immovable in the axial line direction with respect thereto.

According to such a configuration, it is possible to improve the efficiency of the fastening work when fastening the nut 95 to the mount bolt 80.

In the present embodiment, as illustrated in FIGS. 9, 10, and the like, the head portion 84 and the large diameter portion 55a are circular cross section, and the shaft portion 82 is press-fitted into the small diameter portion 55b, so that the mount bolt 80 is fixed to the bolt mount hole 54 in a manner to be un-rotatable around the axial line and to be immovable in the axial line direction with respect thereto. Other fixing methods may be used, such as bake fitting or cold fitting. In any case, the mount bolt 80 is fixed to the cover 70 with the head portion 84 in close contact with the step portion 55c.

In addition to this, making the head portion 84 circular cross section coaxially with the small diameter portion 55b, and press-fitting (or bake fitting or cold fitting) the head portion 84 also into the large diameter portion 55a in the same manner can increase the fixing area of the mount bolt 80 to the bolt mount hole 54, and can further enhance the mounting strength of the mount bolt 80.

Alternatively, it is also possible to form the head portion 84 and the large diameter portion 55a in a non-circular shape and then to press-fit (or bake fitting or cold fitting) the head portion 84 into the large diameter portion 55a.

Enhancing the strength of mounting the mount bolt 80 to the bolt mount hole 54, even if the tightening torque of the nut 95 extends to the aluminum casting cover 70 through the mount bolt 80 when mounting the mount plate 260 to the cover 70, can withstand it and can firmly tighten the nut 95. When the cover 70 is made of cast iron, thickness of the cover 70 can be manufactured thinner than in the case of the aluminum casting.

When a liquid gasket or a bond is applied to the surface of the small diameter portion 55b prior to mounting of the mount bolt 80, a lubricating oil in the housing 50 can be reliably prevented from seeping out through a minute gap between the small diameter portion 55b and the shaft portion 82.

In the present embodiment, as described above, the bolt mount holes 54 are arranged so that the axial line positions of the mount bolts 80 to be inserted into the bolt mount holes 54 are located inward the area S (see FIG. 6) which is defined by connecting the axial lines of the plurality of connection bolts 75 (the plurality of threaded holes 67) when viewed along the vehicle width direction.

In the modified configuration in which the housing 50 is so configured as to have a housing body integrally having an end wall forming the inner side wall 52 and a peripheral wall forming the intermediate wall 58, and a cover forming the outer side wall 56, the bolt mount hole is located inward of the peripheral wall in the radial direction when viewed along the vehicle width direction.

In the present embodiment, the case in which the portal unit 1 is applied to the rear wheel 190R serving as a non-steered wheel has been described as an example, but naturally, the portal unit 1 can also be applied to a front wheel 190F serving as a steered wheel.

Figure 11A:
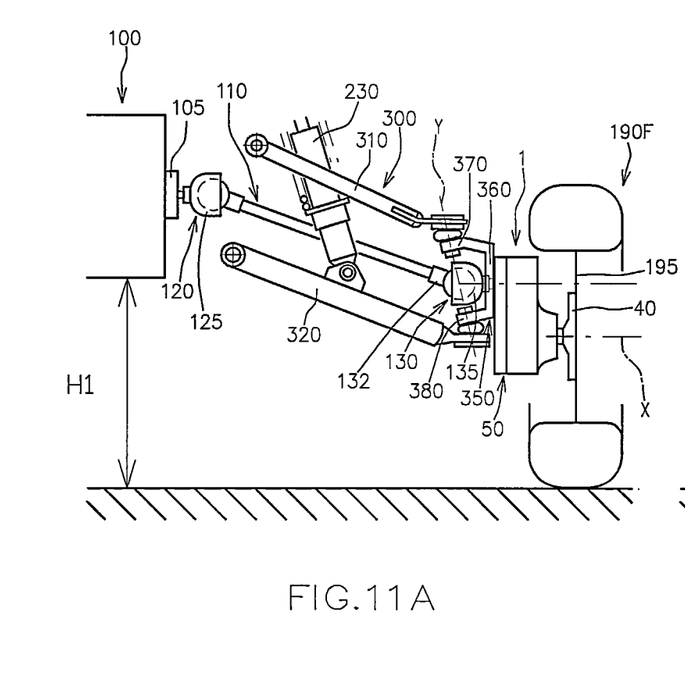
FIG. 11A is a schematic rear view in the vicinity of a front wheel in the vehicle to which the portal unit is applied.

FIG. 11A illustrates a schematic rear view in the vicinity of the front wheel 190F to which the portal unit 1 is applied.

Figure 11B:
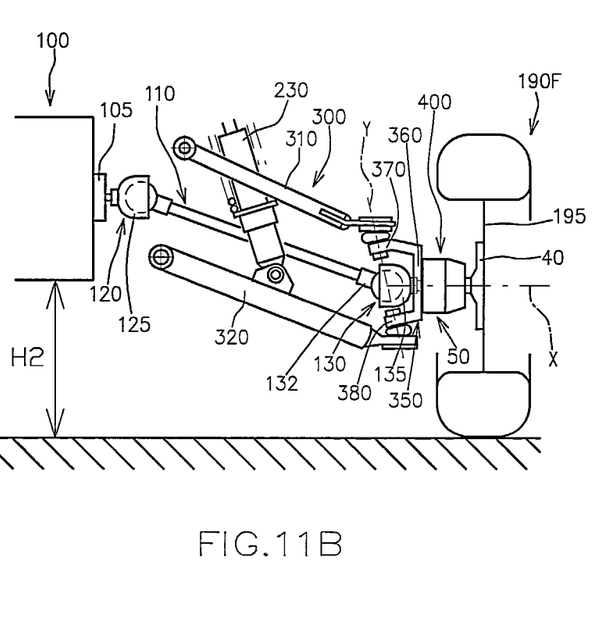
FIG. 11B is a rear view in the vicinity of the front wheel to which the axle drive unit is applied.

For reference, FIG. 11B illustrates a rear view in the vicinity of the front wheel 190F to which the axle drive unit 400 is applied.

In the drawings, the same members as those in the present embodiment are denoted by the same reference numerals.

In a case where the portal unit 1 is applied to the steered wheel, as illustrated in FIG. 11A, the portal unit 1 is connected to a steered wheel suspension unit 300 via a steered wheel connection member 350 (steered wheel knuckle member).

The steered wheel connection member 350 has a mount plate 360 substantially the same in configuration as the mount plate 260 in the non-steered wheel connection member 250, and an upper bracket 370 and a lower bracket 380 which are supported by a mount plate 360.

The upper bracket 370 and the lower bracket 380 have bearing holes along an axial line Y of a kingpin axis.

As illustrated in FIGS. 11A and 11B, the steered wheel suspension unit 300 has an upper suspension arm 310 having a base end portion connected to the frame structure (not illustrated) of the vehicle in a swingable manner in the vertical direction around the axial line along the vehicle longitudinal direction, a lower suspension arm 320 disposed below the upper suspension arm 310 and having a base end portion connected to the frame structure in a swingable manner in the vertical direction around the axial line along the vehicle longitudinal direction, and the shock absorber 230 for absorbing the vertical movement of one (the lower suspension arm 320 in the embodiment illustrated in the figure) of the upper suspension arm 310 and the lower suspension arm 320.

The tip end portions of the upper suspension arm 310 and the lower suspension arm 320 are connected to the bearing holes of the upper and lower brackets 370 and 380, respectively, in a swingable manner around the axial line Y of the kingpin axis.

The invention claimed is:

1. A portal unit interposed between a suspension unit and a driving wheel in a vehicle, the portal unit comprising:
a deceleration gear train decelerating a rotational power that is operatively transmitted from a drive source provided in the vehicle; and
a housing accommodating the deceleration gear unit,
wherein the housing includes an inner side wall that is formed, at a position above a rotation axial line of the driving wheel, with an input opening for inputting the rotational power operatively transmitted from the drive source into the deceleration gear train, an outer side wall that is formed, at a coaxial position with the rotation axial line of the driving wheel, with an output opening for outputting the rotational power, which is decelerated by the deceleration gear train, toward the driving wheel, and an intermediate wall that connects peripheral edges of the inner side wall and the outer side wall so as to form an accommodating space for accommodating the deceleration gear train,
wherein the inner side wall is provided, at a radially outward position of the input opening, with mount bolts for the suspension unit,
wherein the mount bolts each include head portions inserted into the inner side wall, and
wherein the mount bolts each include a shaft portion protruding inwardly in a vehicle width direction.

2. The portal unit according to claim 1, wherein
the mount bolts each include the shaft portion and the head portion provided on one end side of the shaft portion, the shaft portion being provided with a male thread,
the inner side wall is formed with bolt mount holes into which the mount bolts are inserted,
the bolt mount holes each have a large diameter portion that extends from an inner surface in a direction toward an outer surface of the inner side wall, and a small diameter portion that is reduced in diameter with a step portion from a tip end of the large diameter portion and opens to the outer surface of the inner side wall,
the large diameter portion has an opening diameter into which the head portion can be inserted, and the small diameter portion has an opening diameter smaller than the head portion and larger than the shaft portion, and
the mount bolt is configured such that, with the head portion in contact with the step portion, the tip end side of the shaft portion protrudes outward from the outer surface of the inner side wall.

3. The portal unit according to claim 2, wherein the mount bolt is inserted in the bolt mount hole in such a manner as to be un-rotatable around the axial line and to be immovable in the axial line direction with respect thereto.

4. The portal unit according to claim 3, wherein the shaft portion is press-fitted into the small diameter portion.

5. The portal unit according to claim 4, wherein the head portion is press-fitted into the large diameter portion.

6. The portal unit according to claim 4, wherein the head portion and the large diameter portion each have a non-circular shape in a cross section.

7. The portal unit according to claim 2, wherein
the housing has a housing body and a cover,
the housing body includes an end wall and a peripheral wall extending from a peripheral edge of the end wall in a thickness direction of the end wall and is provided, on a far side of the peripheral wall from the end wall, with an installation opening through which the deceleration gear train can be inserted,
the cover is detachably connected to the housing body by connection bolts in such a manner as to close the installation opening,
the cover forms the inner side wall, and the end wall forms the outer side wall,
the peripheral wall is provided with threaded holes that are opened to an end face on the free end side of the peripheral wall so that the connection bolts are screwed thereinto, the cover is provided, at positions respectively corresponding to the threaded holes, with connection holes through which the connection bolts are respectively inserted, and
the axial line positions of the mount bolts are located inside an area which is defined by connecting the axial lines of threaded holes as viewed along the vehicle width direction in a state that the portal unit is mounted on the driving wheel.

8. The portal unit according to claim 2, wherein
the housing has a housing body and a cover,
the housing body includes an end wall and a peripheral wall extending from a peripheral edge of the end wall in a thickness direction of the end wall and is provided, on a far side of the peripheral wall from the end wall, with an installation opening through which the deceleration gear train can be inserted,
the cover is detachably connected to the housing body by connection bolts in such a manner as to close the installation opening,
the cover forms the outer side wall, and the end wall forms the inner side wall,
the peripheral wall is provided with threaded holes that are opened to an end face on the free end side of the peripheral wall so that the connection bolts are screwed thereinto,
the cover is provided, at positions respectively corresponding to the threaded holes, with connection holes through which the connection bolts are respectively inserted, and
the bolt mount holes are located inward of the peripheral wall in the radial direction in a state that the portal unit is mounted on the driving wheel.

9. The portal unit according to claim 1, further comprising:
an input portion supported by the housing so as to receive, through the input opening, the rotational power that is operatively transmitted from the drive source; and
an output portion supported by the housing so as to output, through the output opening toward the driving wheel, the rotational power that is decelerated by the deceleration gear train,
wherein the deceleration gear train has a driving side gear supported by the input portion in a manner to be relatively un-rotatable around the axial line with respect thereto, a driven side gear supported by the output portion in a manner to be relatively un-rotatable around the axial line with respect thereto, and an idle gear engaged with both the driving side gear and the driven side gear, and
wherein the idle gear includes first and second idle gears that are symmetrically arranged across a virtual center plane connecting an axial line of the input portion and an axial line of the output portion.

10. A portal unit interposed between a suspension unit and a driving wheel in a vehicle, the portal unit comprising:
a deceleration gear train decelerating a rotational power that is operatively transmitted from a drive source provided in the vehicle; and
a housing accommodating the deceleration gear unit,
wherein the housing includes an inner side wall that is formed, at a position above a rotation axial line of the driving wheel, with an input opening for inputting the rotational power operatively transmitted from the drive source into the deceleration gear train, an outer side wall that is formed, at a coaxial position with the rotation axial line of the driving wheel, with an output opening for outputting the rotational power, which is decelerated by the deceleration gear train, toward the driving wheel, and an intermediate wall that connects peripheral edges of the inner side wall and the outer side wall so as to form an accommodating space for accommodating the deceleration gear train,
wherein the inner side wall is provided, at a radially outward position of the input opening, with mount bolts for the suspension unit,
wherein the mount bolts each include a shaft portion protruding inwardly in a vehicle width direction,
wherein the mount bolts each include the shaft portion and a head portion provided on one end side of the shaft portion, the shaft portion being provided with a male thread,
wherein the inner side wall is formed with bolt mount holes into which the mount bolts are inserted,
wherein the bolt mount holes each have a large diameter portion that extends from an inner surface in a direction toward an outer surface of the inner side wall, and a small diameter portion that is reduced in diameter with a step portion from a tip end of the large diameter portion and opens to the outer surface of the inner side wall,
wherein the large diameter portion has an opening diameter into which the head portion can be inserted, and the small diameter portion has an opening diameter smaller than the head portion and larger than the shaft portion, and
wherein the mount bolt is configured such that, with the head portion in contact with the step portion, the tip end side of the shaft portion protrudes outward from the outer surface of the inner side wall.

11. A portal unit interposed between a suspension unit and a driving wheel in a vehicle, the portal unit comprising:
a deceleration gear train decelerating a rotational power that is operatively transmitted from a drive source provided in the vehicle; and
a housing accommodating the deceleration gear unit,
wherein the housing includes an inner side wall that is formed, at a position above a rotation axial line of the driving wheel, with an input opening for inputting the rotational power operatively transmitted from the drive source into the deceleration gear train, an outer side wall that is formed, at a coaxial position with the rotation axial line of the driving wheel, with an output opening for outputting the rotational power, which is decelerated by the deceleration gear train, toward the driving wheel, and an intermediate wall that connects peripheral edges of the inner side wall and the outer side wall so as to form an accommodating space for accommodating the deceleration gear train,
wherein the inner side wall is provided, at a radially outward position of the input opening, with mount bolts for the suspension unit,
wherein the mount bolts each include a shaft portion protruding inwardly in a vehicle width direction,
wherein the mount bolts each include the shaft portion and a head portion provided on one end side of the shaft portion, the shaft portion being provided with a male thread,
wherein the inner side wall is formed with bolt mount holes into which the mount bolts are inserted,
wherein the bolt mount holes each have a large diameter portion that extends from an inner surface in a direction toward an outer surface of the inner side wall, and a small diameter portion that is reduced in diameter with a step portion from a tip end of the large diameter portion and opens to the outer surface of the inner side wall, wherein the large diameter portion has an opening diameter into which the head portion can be inserted, and the small diameter portion has an opening diameter smaller than the head portion and larger than the shaft portion, wherein the mount bolt is configured such that, with the head portion in contact with the step portion, the tip end side of the shaft portion protrudes outward from the outer surface of the inner side wall, and wherein the mount bolt is inserted in the bolt mount hole in such a manner as to be un-rotatable around the axial line and to be immovable in the axial line direction with respect thereto.

* * * * *